US009293917B2

(12) United States Patent
Zhou et al.

(10) Patent No.: US 9,293,917 B2
(45) Date of Patent: Mar. 22, 2016

(54) ENERGY STORAGE SYSTEM

(75) Inventors: Haihua Zhou, El Segundo, CA (US); Tanmoy Battacharya, Kharagpur (IN); Ashwin M. Khambadkone, Singpore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 631 days.

(21) Appl. No.: 13/806,130

(22) PCT Filed: Jun. 21, 2011

(86) PCT No.: PCT/SG2011/000219
§ 371 (c)(1),
(2), (4) Date: Dec. 20, 2012

(87) PCT Pub. No.: WO2011/162722
PCT Pub. Date: Dec. 29, 2011

(65) Prior Publication Data
US 2013/0099581 A1    Apr. 25, 2013

(30) Foreign Application Priority Data
Jun. 21, 2010    (SG) ................ 201004447-7

(51) Int. Cl.
*H02J 7/34*    (2006.01)
*H02J 1/10*    (2006.01)
*H02J 1/12*    (2006.01)

(52) U.S. Cl.
CPC ... *H02J 1/10* (2013.01); *H02J 1/12* (2013.01); *H02J 7/34* (2013.01); *H02J 7/345* (2013.01); *Y02B 10/30* (2013.01); *Y10T 307/707* (2015.04)

(58) Field of Classification Search
CPC ......... H02J 1/12; H02J 7/345; Y10T 307/707
USPC .......................................... 307/82
See application file for complete search history.

(56) References Cited

U.S. PATENT DOCUMENTS

| | | | |
|---|---|---|---|
| 6,938,733 B2 * | 9/2005 | Eilinger | 187/290 |
| 2005/0151513 A1 | 7/2005 | Cook et al. | |
| 2006/0028778 A1 * | 2/2006 | O'Gorman et al. | 361/62 |
| 2006/0139823 A1 * | 6/2006 | Shoji et al. | 361/56 |
| 2007/0062744 A1 | 3/2007 | Weidenheimer et al. | |
| 2010/0052423 A1 | 3/2010 | Shimada et al. | |
| 2010/0097031 A1 | 4/2010 | King et al. | |

(Continued)

FOREIGN PATENT DOCUMENTS

| | | | |
|---|---|---|---|
| EP | 1914869 A1 * | 4/2008 | |
| JP | 2010016996 A * | 1/2010 | |
| WO | 2011162722 A1 | 12/2011 | |

OTHER PUBLICATIONS

Foreign Communication From a Related Counterpart Application, International Search Report and Written Opinion dated Sep. 6, 2011, International Application No. PCT/SG2011/000219, filed on Jun. 21, 2011.

(Continued)

*Primary Examiner* — Scott Bauer

(57) ABSTRACT

An energy storage system comprises a plurality of storage mediums having substantially different energy and power density that are each connected to a DC bus via a respective bidirectional isolated DC-DC converter; and a controller configured to independently determine a current demand for each storage medium based on a control mode.

21 Claims, 18 Drawing Sheets

(56) References Cited

U.S. PATENT DOCUMENTS

2010/0133025 A1    6/2010    Flett
2011/0084648 A1*  4/2011    Cao et al. ..................... 320/103

OTHER PUBLICATIONS

Foreign Communication From a Related Counterpart Application, International Preliminary Report on Patentability dated Janury 10, 2013, International Application No. PCT/SG2011/000219, filed on Jun. 21, 2011.

Dietrich, P., et al., "Hy. Power—A technology Platform combining a fuel cell system and a supercapacitor", vol. 4 Part 11 pp. 1192, in Handbook of Fuel Cells—Fundamentals, Technology and Applications, John Wiley & Sons, 2003.

Zhou, Haihua, et al., "Interleaved Bi-directional Dual Active Bridge DC-DC Converter for Interfacing Ultracapacitor in Micro-Grid Application", ISIE.

Zhou, Haihua, et al., "Composite energy storage system using dynamic energy management in micro-grid applications", The 2010 International Power Electronics Conference, ECCE Asia, 2010.

Tran, Duong, et al., "Energy management and dynamic control in composite energy storage system for micro-grid applications", IECON-2010, 11 2100.

Zhou, Haihua, et al., "Composite Energy Storage System Involving Battery and Ultracapacitor With Dynamic Energy Management in Microgrid Applications", Power Electronics, IEEE Transactions on vol. 26 , Issue: 3 10 ,2011 , pp. 923-930.

* cited by examiner

COMPARISON OF DEVICE STRESS UNDER SAME OUTPUT POWER
|  | IPOP (p.u.) | IPOS (p.u.) | ISOS (p.u.) |
|---|---|---|---|
| Primary |  |  |  |
| Switch Current Rating | $1/n$ | $1/n$ | 1 |
| Switch Voltage Rating | 1 | 1 | $1/n$ |
| Secondary |  |  |  |
| Switch Current Rating | $1/n$ | 1 | 1 |
| Switch Voltage Rating | 1 | $1/n$ | $1/n$ |
| Turns ratio | 1 | $1/n$ | 1 |
Figure 12
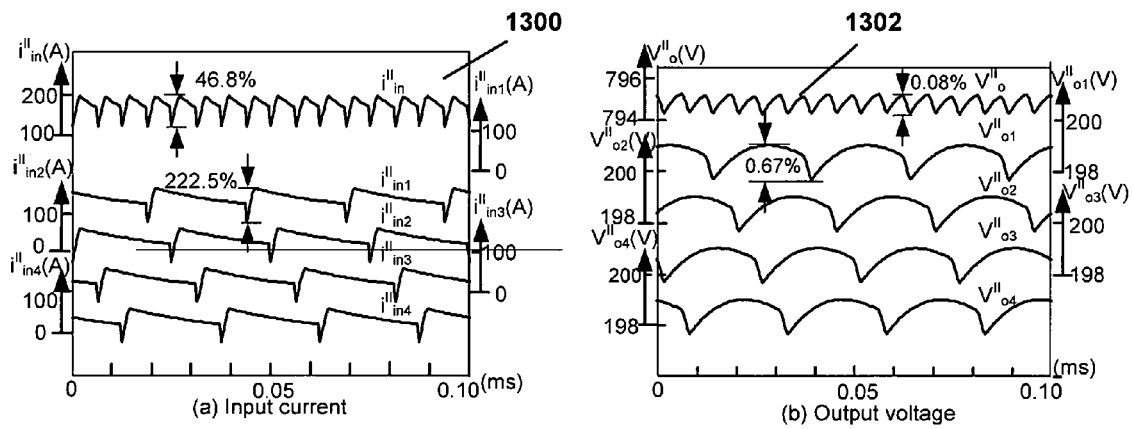
Figure 13
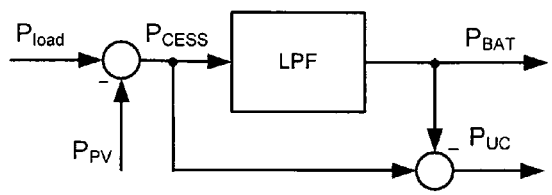
Figure 14 (a)

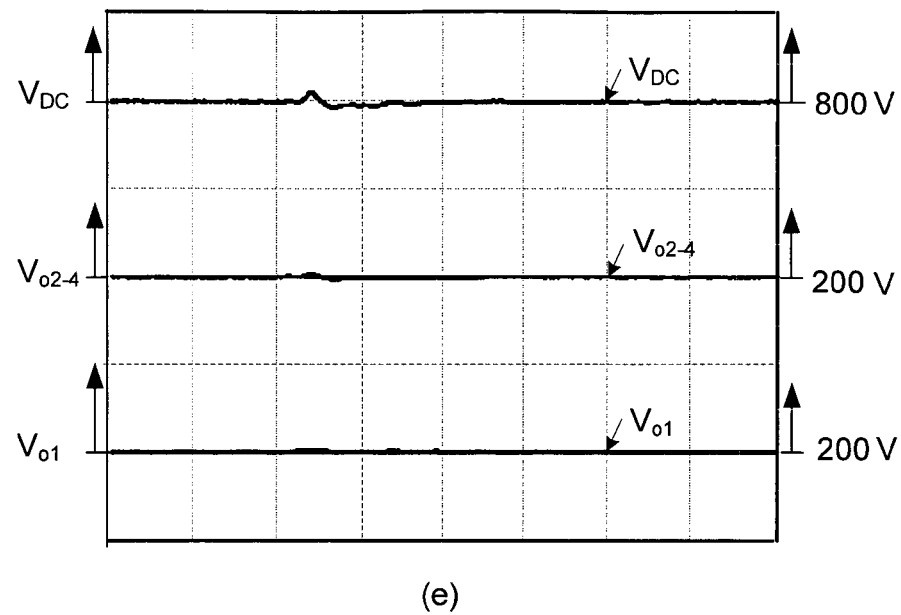
(e)
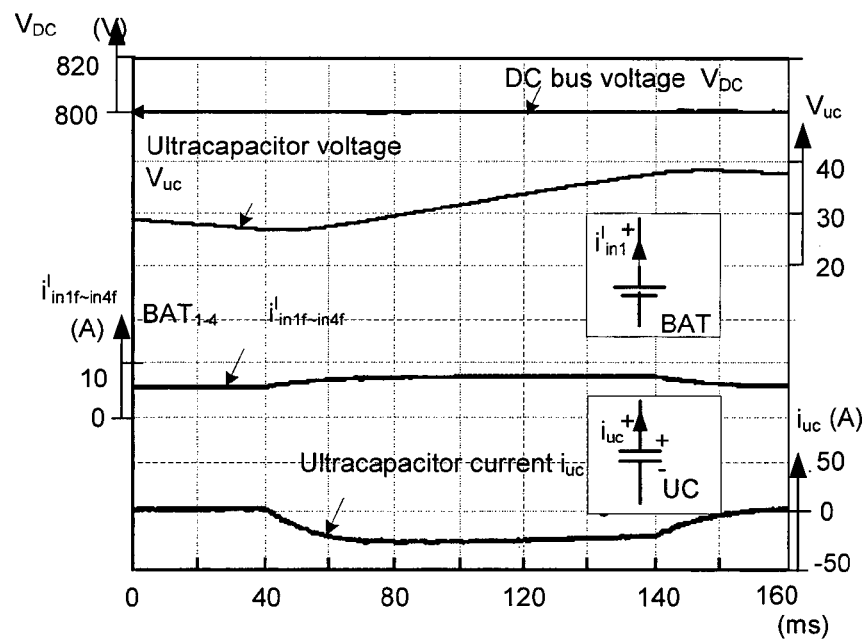
(f)
Figure 15

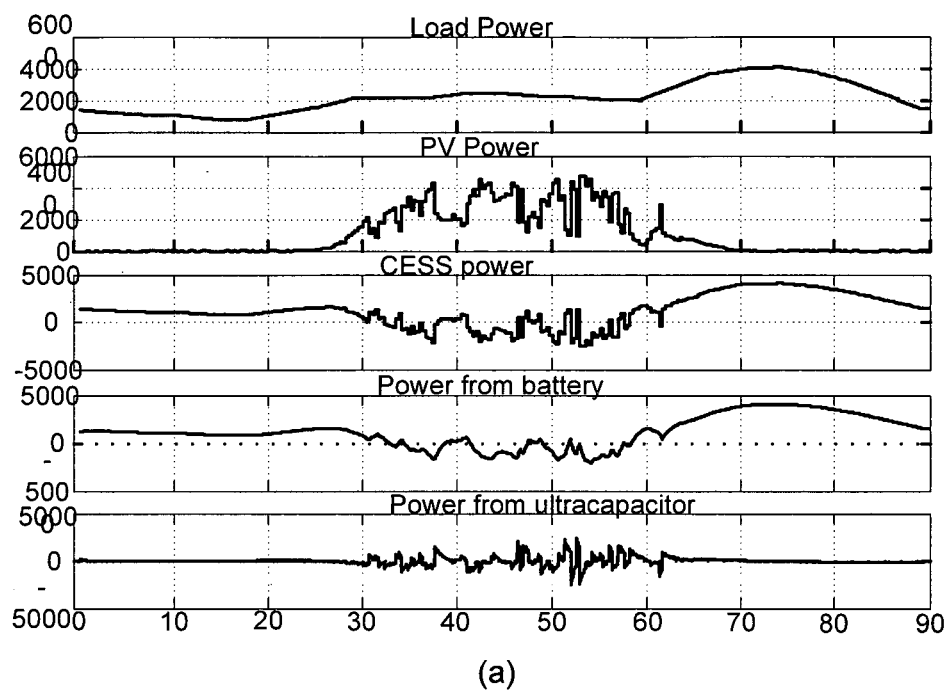
(a)
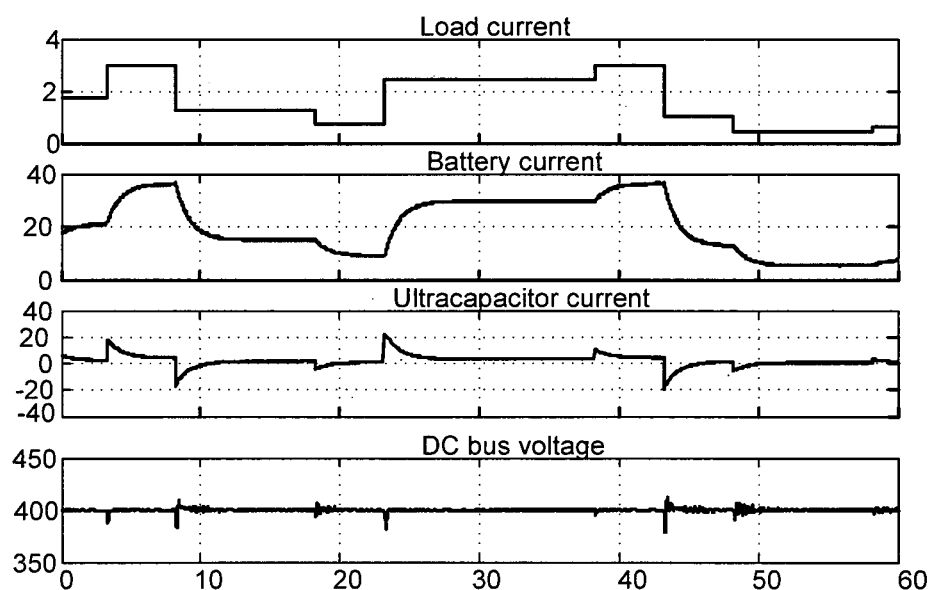
(b)
Figure 16

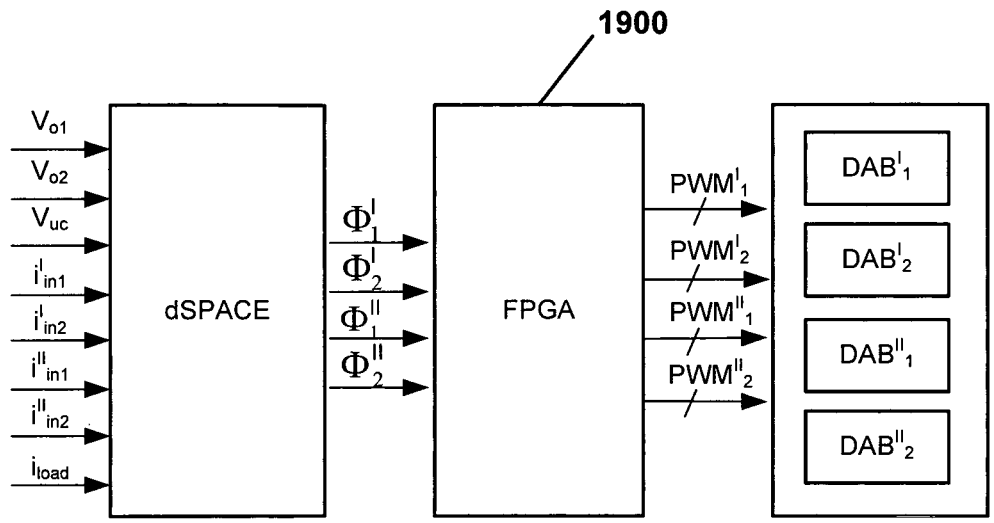

Figure 19

EXPERIMENTAL PARAMETERS

| | | |
|---|---|---|
| Rated ultracapacitor voltage (V) | $V_{UC}$ | 24 |
| Battery voltage (V) | $V_{BAT}$ | 24 |
| Output voltage rating of each DAB (V) | $V_{o1}$ | 100 |
| Transformer turns ratio | $n$ | 4 |
| Switching frequency (kHz) | $f_s$ | 20 |
| Rated output Power of each DAB (W) | $P_{o1}$ | 300 |
| Leakage Inductance of $DAB_1^I$ ($\mu$H) | $L_{k1}$ | 29.8 |
| Leakage Inductance of $DAB_2^I$ ($\mu$H) | $L_{k2}$ | 30.1 |
| Leakage Inductance of $DAB_1^{II}$ ($\mu$H) | $L_{k3}$ | 29.5 |
| Leakage Inductance of $DAB_2^{II}$ ($\mu$H) | $L_{k4}$ | 29.9 |
| Capacitance of output voltage $V_{o1}$ ($\mu$F) | $C_{o1}$ | 330x3 |
| Capacitance of output voltage $V_{o2}$ ($\mu$F) | $C_{o1}$ | 330x3 |

Figure 20

| Sources | Terminal voltage | High power application | Converter design re PCT/SG2011/000219 | | | | Topology |
|---|---|---|---|---|---|---|---|
| | | | Input | | Output | | |
| | | | High current | High voltage | High current | High voltage | |
| Ultracapacitor | High | Yes | Yes | Yes | Yes | Yes | 10(a) |
| Ultracapacitor | Low | Yes | Yes | No | Yes | Yes | 10(d) |
| Battery | High | No | No | Yes | No | Yes | 10(c) |
| Battery | Low | No | No | No | No | Yes | 10(e) |
| ... | ... | ... | ... | ... | ... | ... | ... |

Figure 25

ENERGY STORAGE SYSTEM

CROSS-REFERENCE TO RELATED APPLICATIONS

This application is a filing under 35 U.S.C. 371 as the National Stage of International Application No. PCT/SG201/000219, filed Jun. 21, 2011 and entitled "Energy Storage System," which claims the benefit of and priority to Singapore Patent Application No. SG 201004447-7, filed Jun. 21, 2010 and entitled "Energy Storage System", both of which are incorporated herein by reference in their entirety for all purposes.

FIELD

The present invention relates to an energy storage system.

BACKGROUND

Today's electricity grid relies on a number of different sources of power generation. Traditional sources include coal fired turbines, gas fired turbines, oil fired turbines, hydro dams, nuclear reactors and the like. However as shown in FIG. 1, if energy demand increases by 5% each year fossil fuel reserves 100 will run out by approximately 2050. As a result alternative energy sources and more environmentally friendly generation techniques are coming into favour, including wind farms, solar farms, tidal generators, etc. However both traditional and green generation suffer from the same problem, that they need to be located remotely a long way from where the demand is. Moreover, they suffer from intermittency.

For traditional generation the remote location is required either due to pollution concerns or the large amount of space required. For green generation often the natural resource is in the remote location, or it is due to the large amount of space required. In either case the distance the electricity needs to be transmitted causes difficulty in terms of the cost of the infrastructure and the electrical losses that may result. Also more reliance on fewer large scale generation sources may lead to lower reliability for the system and less stability.

One option is smaller generation plants closer to the demand centres. However it is difficult to situate even small generation plants close to population centres without raising noise, pollution or risk concerns with the inhabitants.

At the other end of the scale it is has also been proposed to integrate green energy generation into buildings and in some cases to design the building to have zero energy consumption overall. FIG. 2 shows a comparison 200 between the typical solar Photovoltaic (PV) generation profile 202 over 24 hours and the building load profile 204. This shows a temporal mismatch where sometimes the grid is required to supply 206 or absorb 208 energy at certain times of the day.

When generation does not match demand, the frequency of the grid tends to vary. This needs regulation. Regulating reserves are put in use to overcome the problems. Such reserves are fast responding power plants on stand by. However, the response time required when renewable are used in generating mix is very small. Due to moving cloud, the solar PV output can drop very quickly and change to a new value causing a fast large increase in grid load. Similarly during peak sunshine hours there will be an large excess of supply from the PV array (i.e. the building appears as a generator not a load). If either were to happen in an aggregated form, a fast acting regulating reserve would be needed to keep the grid frequency within mandatory limits. Thus if building integrated PV arrays become highly popular this may cause challenges for the grid.

Another complication is that the metering and billing system might have to be able to cope with two way power flow. Also power systems need to be rated off the peak power requirements, even with building integrated generation, the remote generation and grid capacity might need to be rated for if there was no building integrated generation. As an example if the whole city was covered by cloud (and the building integrated generation was all solar) the shortfall would have to come from traditional generation. Thus the system might need generation capacity (including that of the building integrated generation) twice that of the peak demand, for redundancy (this could be somewhat reduced by diversity into wind, micro hydro, geothermal etc).

Thus it would be desirable for such green generation systems, particularly those building integrated, to incorporate some mechanism to avoid the demand/supply mismatches being propagated into the grid.

Several attempts have been made to avoid the problems mentioned. The simplest is a battery bank. As can be seen in FIG. 3 the Ragone plot 300 shows batteries 302 have high energy density 304 but suffer from the disadvantage that their power density 306 is not very high. High energy density 304 means that the steady state capacity for energy storage is relative high. Low power density 306 means that high frequency variations such as changes in demand that occur over milli seconds cannot be supplied or absorbed by battery bank 302. Thus with a battery bank 302 high frequency variations will still be propagated to the grid.

Similarly other energy storage mediums suffer from problems associated with either energy density 304 or power density 306. Capacitors 308, fuel cells 310 and electrolytic capacitors 312 are all shown in disparate locations in the plot 300 which do not intersect.

Also since gaps 314 exist in the Ragone plot 300, some scenarios of load profile and PV profile may not be able to be accommodated with current technology.

Prior art attempts to solve this include US patent publication numbers 2007/0062744 and 2010/0133025 which propose a composite energy storage system which combines a battery bank and a capacitor bank. However they suffer from the disadvantage that it is a rigid configuration that may not be efficient or optimal in certain circumstances such as the power and energy requirements of a smart micro-grid.

This problem may be exaggerated in an island or an isolated system not connected to the grid. In that case all load demands must always be provided by the green generation system and/or an energy storage system, both high frequency variation in the load and/or generation and steady state.

SUMMARY

In general terms the invention proposes a composite of different types of electrical energy storage mediums, where current for each medium can be independently controlled depending of the dynamic capacity of each medium, the DC voltage can be easily configured for different AC load configurations and/or where energy storage modules can be "hot swapped" in with a plug and play capability. This may have one or more of the advantages of easy reconfigurability of output, flexibility of storage mediums, optimised size/weight, scalability, longer life, higher efficiency, better power quality, plug and play capability modularity, active battery charge balancing or distributing and/or lower cost.

In a first specific aspect the invention provides an energy storage system comprising:
- a plurality of storage mediums having substantially different energy and power density each connected to a DC bus via a respective bidirectional isolated DC-DC converter; and
- a controller configured to independently determine a current demand for each storage medium based on a control mode.

In a second specific aspect the invention provides an energy apparatus comprising;
- an energy generation system, and
- an energy storage system, adjacent to the energy generation system and configured to absorb any excess power and supply any shortfall power from the energy generation system.

In a third specific aspect the invention provides a method of distributing current between a plurality of energy storage mediums connected between a generator and a load comprising:
- determining an overall current demand based on an instantaneous generation power from the generator and an instantaneous load power from the load;
- controlling a current a slow response energy storage medium based on a low frequency component of the overall current demand; and
- controlling a current of a fast response energy storage medium based on a high frequency component of the overall current demand.

Embodiments may be optionally be implemented according to any one of claim 2 to 15, 17 or 18.

BRIEF DESCRIPTION OF THE DRAWINGS

FIG. 12 is a table of the switching stresses in the converter in FIG. 9;

FIGS. 13(a) and (b) are graphs of the input and output ripple of the CESS in FIG. 11;

FIGS. 16(a) and 16(b) are graphs of the simulated results of an embodiment;

FIG. 19 is a table of the parameters for the prototype in FIG. 17;

FIGS. 20-24 are graphs of the performance of the prototype in FIG. 17,

FIG. 25 is a table comparing the connection arrangements; and

DETAILED DESCRIPTION

Figure 1:
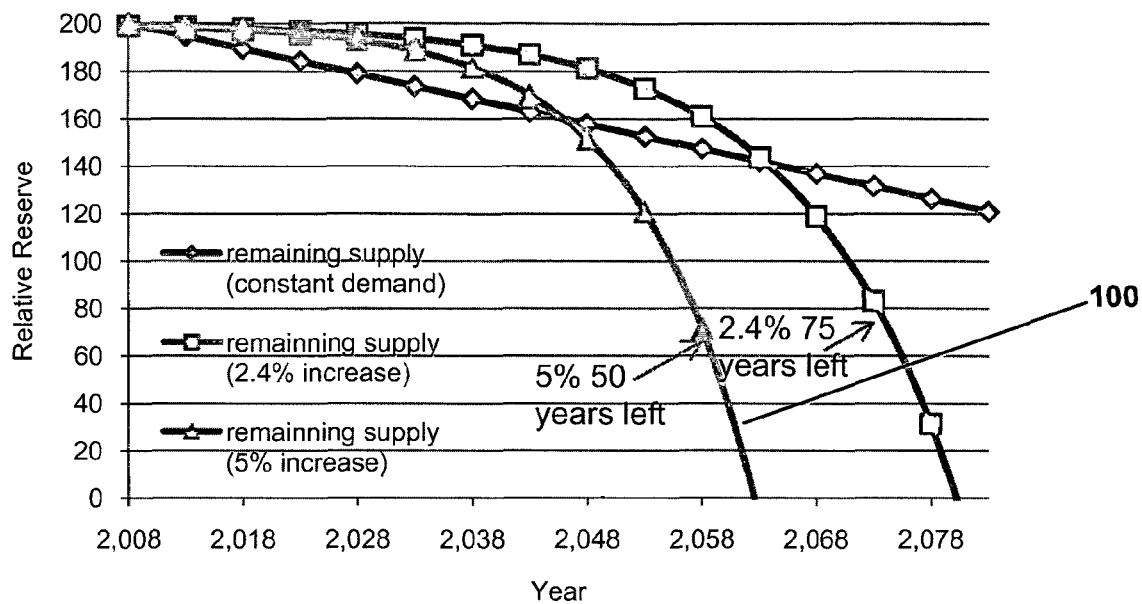
FIG. 1 is a graph of predicted load growth compared to world reserves of fossil fuels.
Figure 2:
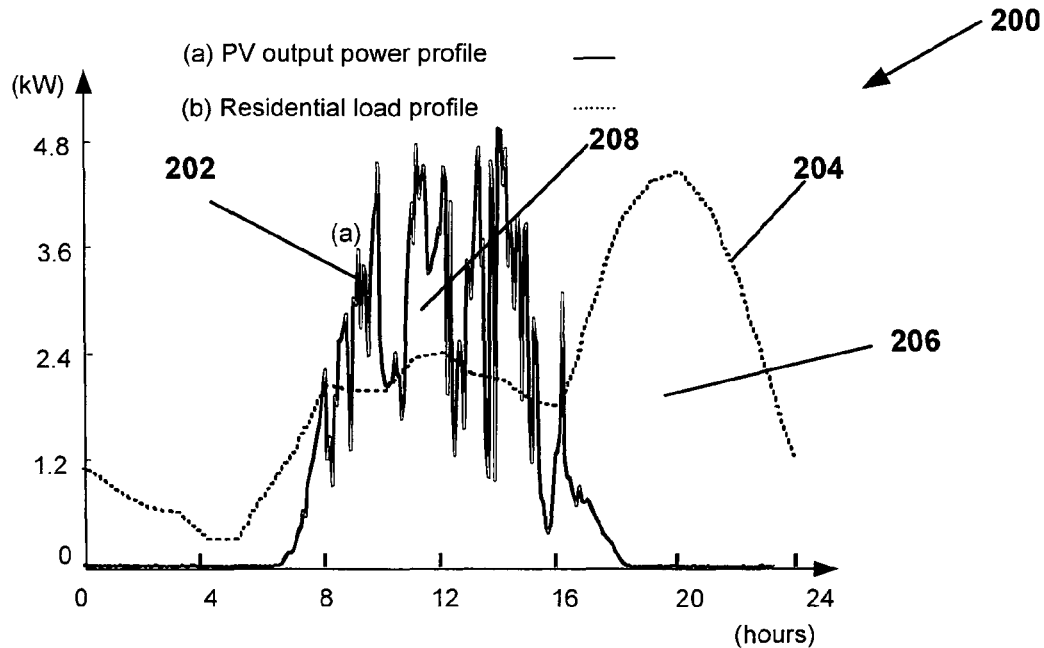
FIG. 2 is a graph of instantaneous power generation and demand for a prior art building integrated PV system.
Figure 3:
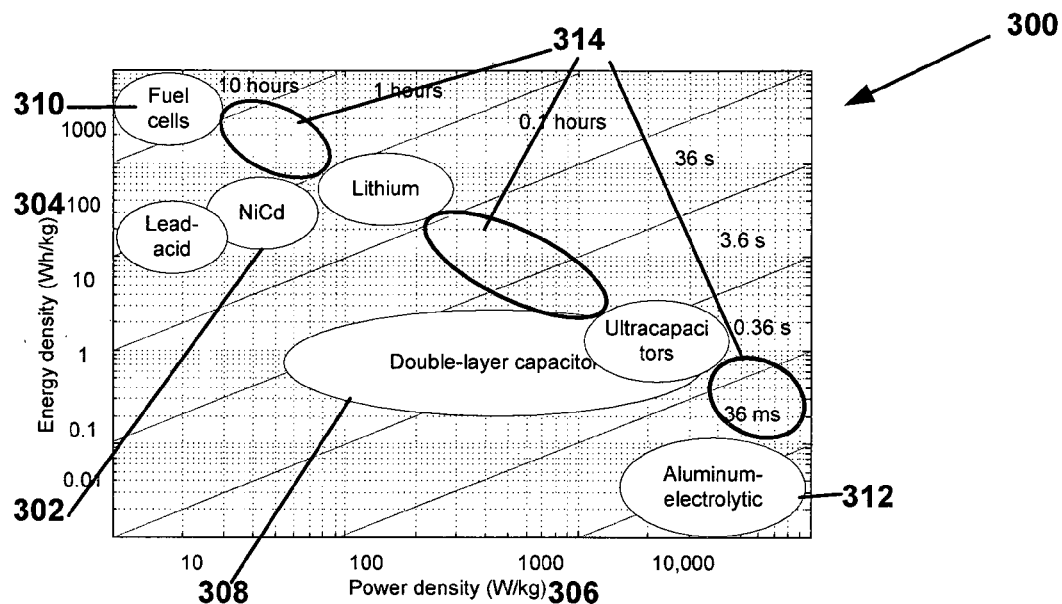
FIG. 3 is a Ragone plot of different storage mediums.

The following documents are incorporated herein by reference:

Singapore patent application number 201004447-7 filed 21 Jun. 2010; Zhou, Bhattacharya, Khambadkone, "Composite energy storage system using dynamic energy management in micro-grid applications", *The 2010 International Power Electronics Conference, ECCE Asia*, 2010;

Tran, Zhou, Khambadkone, "Energy management and dynamic control in composite energy storage system for micro-grid applications" *IECON*-2010, 11 2100; and Haihua Zhou; Bhattacharya, T.; Duong Tran; Siew, T. S. T.; Khambadkone, A. M.; "Composite Energy Storage System Involving Battery and Ultracapacitor With Dynamic Energy Management in Microgrid Applications", *Power Electronics, IEEE Transactions on* Volume: 26, Issue: 3 10, 2011, Page(s): 923-930.

An energy system 400 according to the embodiment shown in FIG. 4(a) is now described. The system includes a load 402, a DC bus 404, a PV module 406, a composite energy storage system (CESS) 408 and a controller 410. The load 402 may be a single phase residential load, or in larger scale implantations may be a 3 phase high voltage diversified load. The PV module 406 may be building integrated, such as roof mounted, and will provide a DC voltage and current that varies considerable over the daytime, as sunlight conditions determine. The CESS 408 may store energy or supply energy, depending on the load 402 relative to the supply from the PV module 406. Thus typically the current flows from the PV module 406 through the DC bus 404 to the load 402. The CESS 408 instantaneously resolves any mismatch.

The physical installation of the energy system 400 is shown in FIGS. 4(b) and 4(c). The PV module 406 may be installed on the roof 412 of the building 414. A protection system and cabling 416 connect the PV module 406 to the DC bus 404 in a cool dark location. The controller 410 and CESS 408 are connected adjacent to the DC bus 404. The load 402 is distributed throughout the building and is consolidated at a distribution board connected to the DC bus 404.

Figure 4:
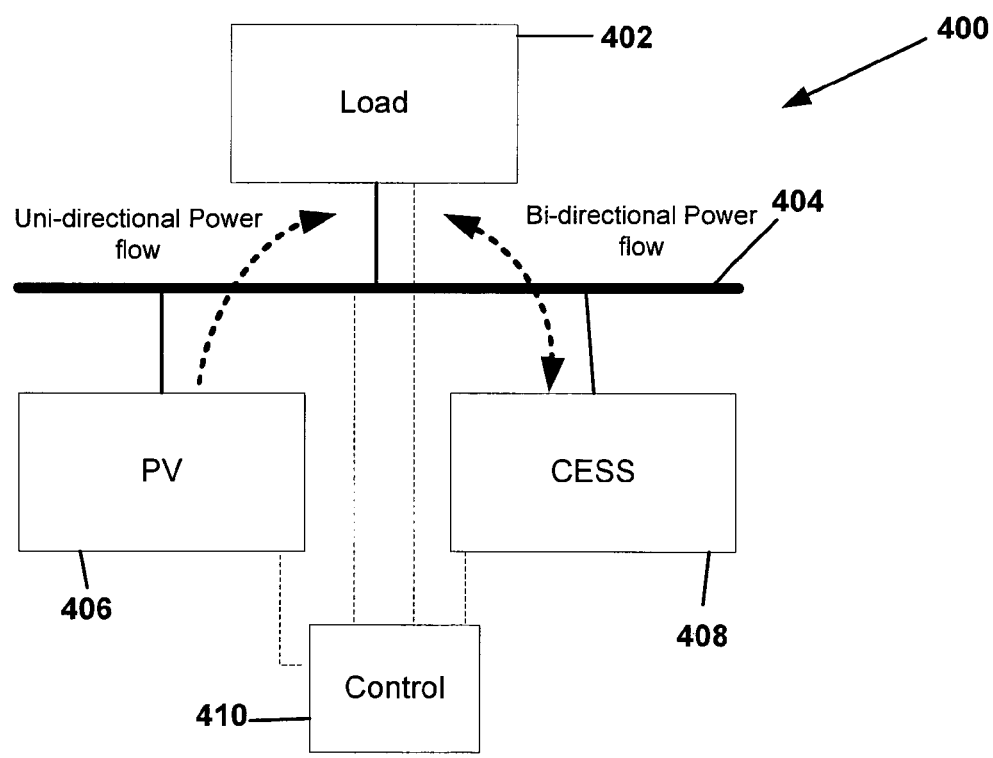
FIG. 4(a) is schematic diagram showing an energy system according to an example embodiment.
FIG. 4(b) is a schematic showing the physical installation of the components in FIG. 4(a)
FIG. 4(c) is a schematic showing the physical installation of the components in FIG. 4(a)
Figure 4:
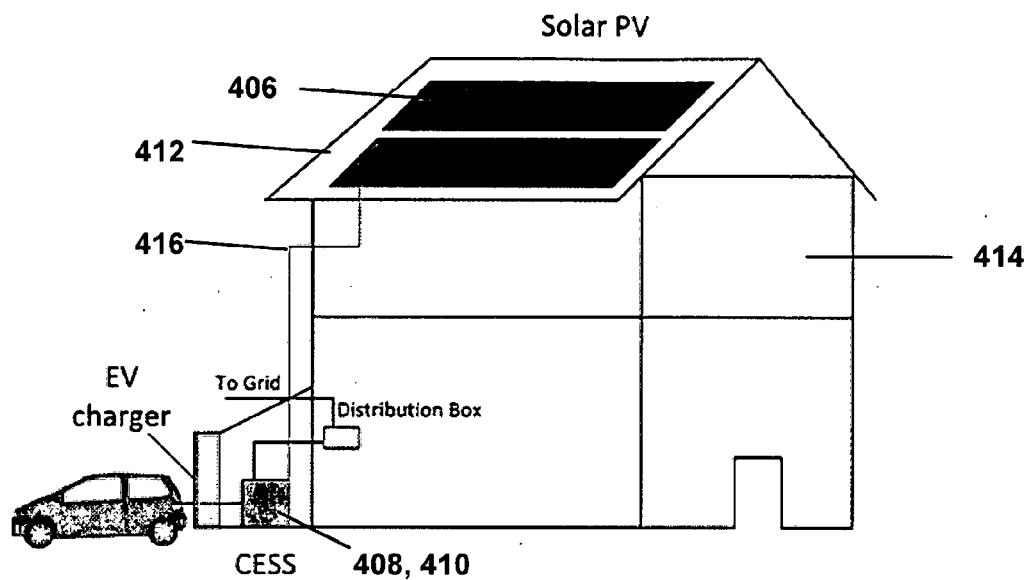
Figure 4:
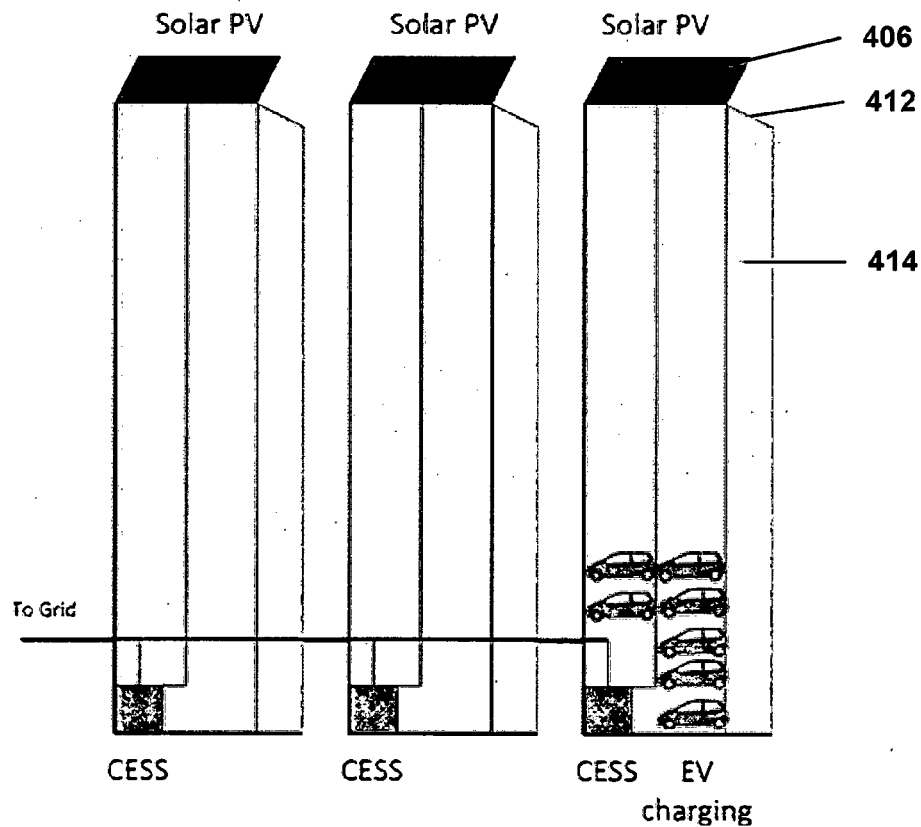
Figure 5:
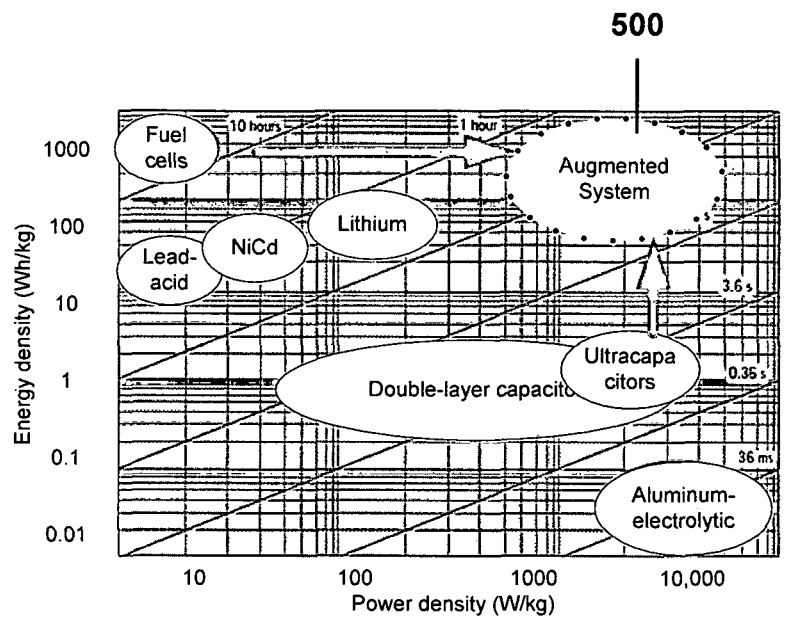
FIG. 5 is a Ragone plot of the operating areas of the system in FIG. 4.

As shown in FIG. 5 the CESS 408 according to the embodiment in FIG. 4, is easily reconfigurable to a desired operating region 500. This allows the CESS 408 flexibility to supply a far greater range of generation/load scenarios.

The particular choice of configuration for the CESS 408 may depend on the generation/load scenario and the application or design parameters. Such parameters may include the maximum power, the maximum energy, the maximum weight, the maximum volume, the maximum ripple or EMI level, load type (single or three phase), output voltage level, desired life expectancy, desired level of reliability, level of control complexity, grid control integration and cost. The configuration will relate to a particular combination of different storage mediums together with a particular control strategy that may be implemented in hardware, software or a combination of the two.

Figure 6:
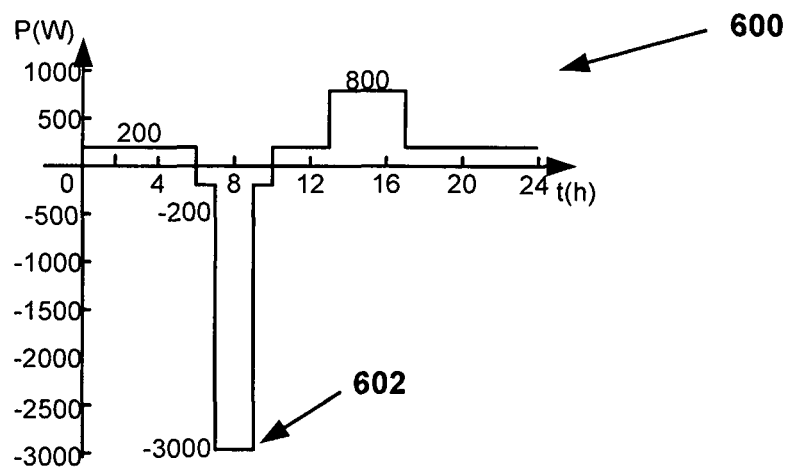
FIG. 6 is a graph of a typical load profile indicating peak power and overall energy requirements.
Figure 7:
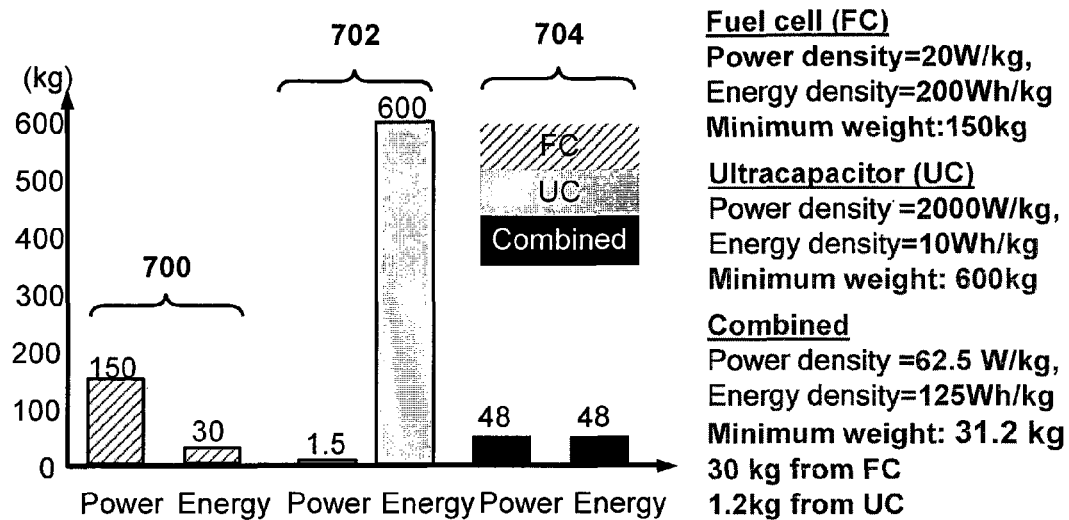
FIG. 7 is a graph comparing the weight of various alternatives for energy storage including an embodiment.

For example as shown in FIG. 6 a load profile 600 is shown with a peak power requirement 602 of 3 kW and an energy requirement of 6 kWh over each 24 hour period. Thus as shown in FIG. 7, if the CESS 408 was implemented using just a fuel cell 700, the weigh would be 150 kg. If the CESS 408 was implemented using just an ultracapacitor 702, the weigh would be 600 kg. For the load profile 600 if the optimum configuration 704 was found to be a 6 kWh fuel cell combined with a 3 kW ultracapacitor, the weight would only be 31.2 kg. The choice of which mix of storage medium to use may depend on how volatile or dynamic the generation/load profiles are, cost and the overall power and energy requirements.

Figure 8:
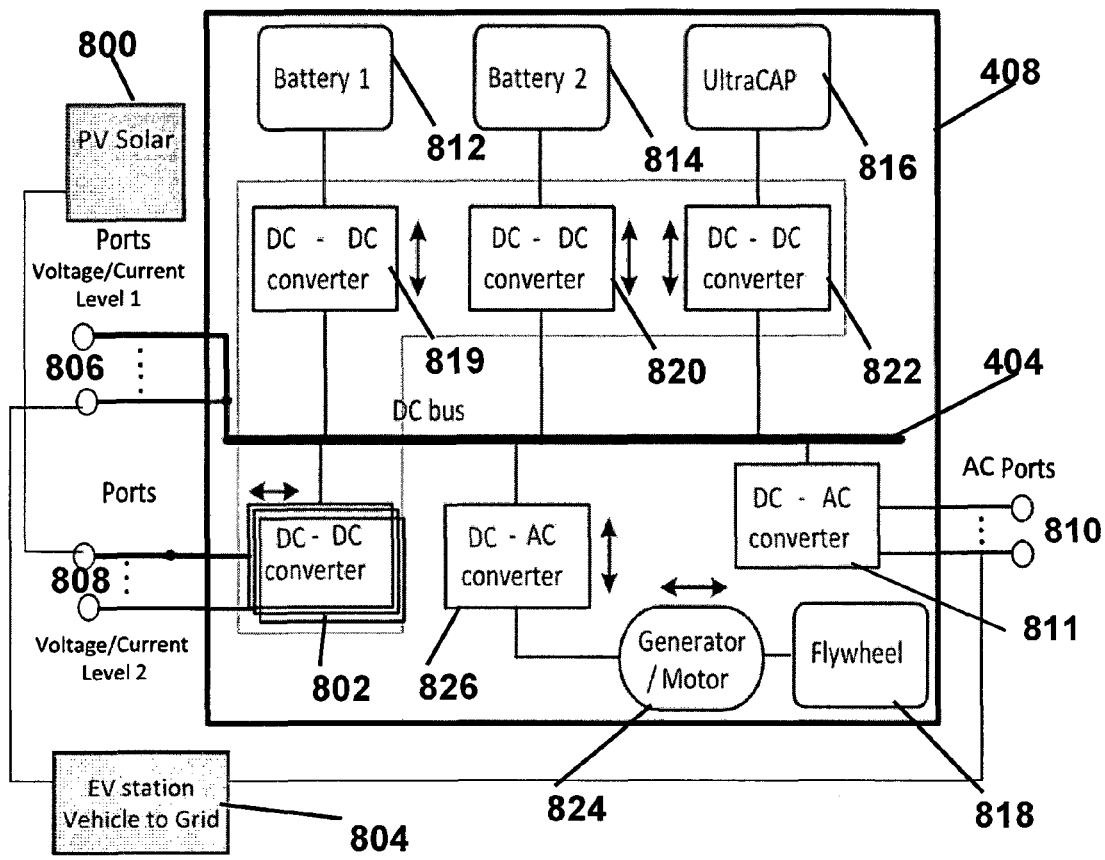
FIG. 8 is a block diagram of the energy system in FIG. 4.

The CESS 408 is shown in more detail in FIG. 8. The PV module 406 includes an array of solar cells 800, connected to the DC bus 404 via a DC-DC converter 802. Energy generation may come from other sources such as a wind turbine, micro hydro, combined cycle turbine/generator or an electric vehicle 804 configured for emergency power generation mode. In larger scale installations, different energy generation and/or storage mediums might be appropriate.

The load 402 may be connected to a first DC voltage port 806, a second DC voltage port 808 or a third AC voltage port 810. The first port 806 may be directly connected to the DC bus 404, and thus at a higher voltage than the second port 808. The DC-DC converter 802 and solar cell 800 may be connected to the second port 808. The electric vehicle 804 may be connected to either the first port 806 or the third port 810. The third port 810 is connected to the DC bus 404 via a DC-AC converter 811. The electric vehicle 804 may also be a load, connected to the first port 806 or the third port 810 for charging.

As mentioned previously the choice of storage mediums depends on a number of parameters. In FIG. 8 the CESS 408 is shown with a first battery 812, a second battery 814, an ultracapacitor 816 and a flywheel 818. The first battery 812, second battery 814, and ultracapacitor 816 are connected to the DC bus 404 via respective DC-DC converters 819,820, 822. The flywheel 818 is connected to a AC generator / motor 824 (such as a brushless DC motor) which connects to the DC bus 404 via an DC-AC converter 826.

Figure 9:
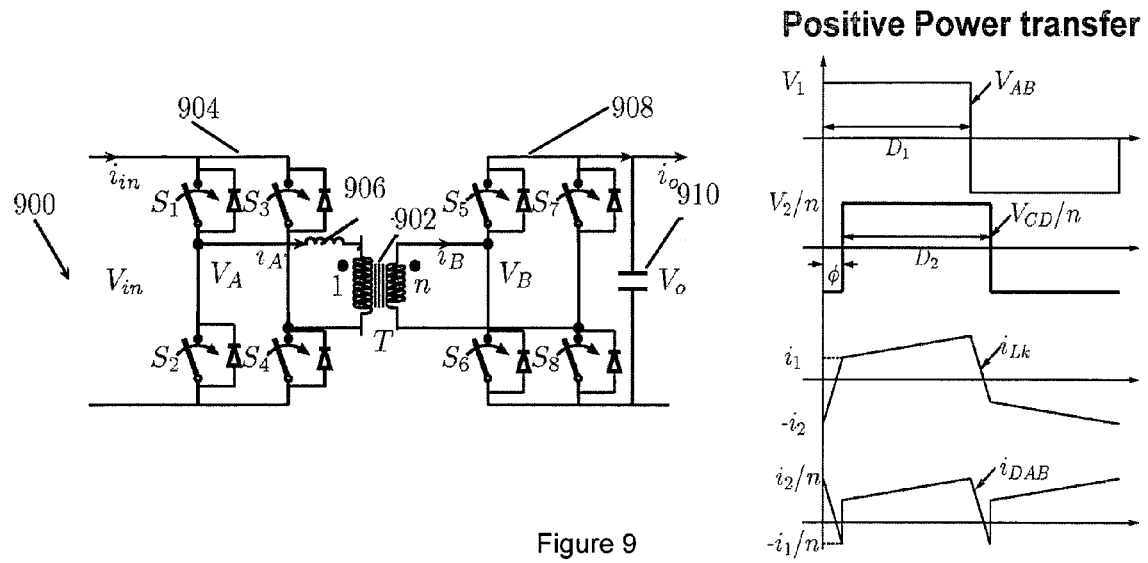
FIG. 9 is a circuit diagram of the DC-DC converter in FIG. 8.

The DC-DC converters 802,819,820,822 are bidirectional isolated DC-DC converters such as a dual active bridge (DAB) converter 900 as shown in FIG. 9. The DAB 900 is bidirectional, isolated, soft switching with a high frequency transformer 902. This allows for a much smaller transformer 902 and filter. Isolation allows the DABs 900 to be connected up in series, parallel or a combination according to different load requirements. Such different connection arrangements are shown in FIGS. 10(a) to 10(h) including input parallel output parallel (IPOP), input parallel output series (IPOS), input series output series (ISOS) and modifications of these. The chosen configurations may also be affected by the relative price of different voltage batteries, ultracapacitors etc. FIG. 25 shows a comparison of the connections arrangements and possible applications for each. Similarly the switching stress is shown in FIG. 12 for each configuration, which will affect the capacity and therefore cost of the switches used.

The DAB 900 includes a first full bridge AC inverter 904, connected in series with a filter inductor 906 and the primary winding of the high frequency transformer 902. The transformer 902 provides isolation, but due to high frequency switching its size can be minimised. The secondary winding of the transformer 902 is connected to a full bridge AC-DC converter 908, with a filter capacitor 910 connected at the output.

Figure 11:
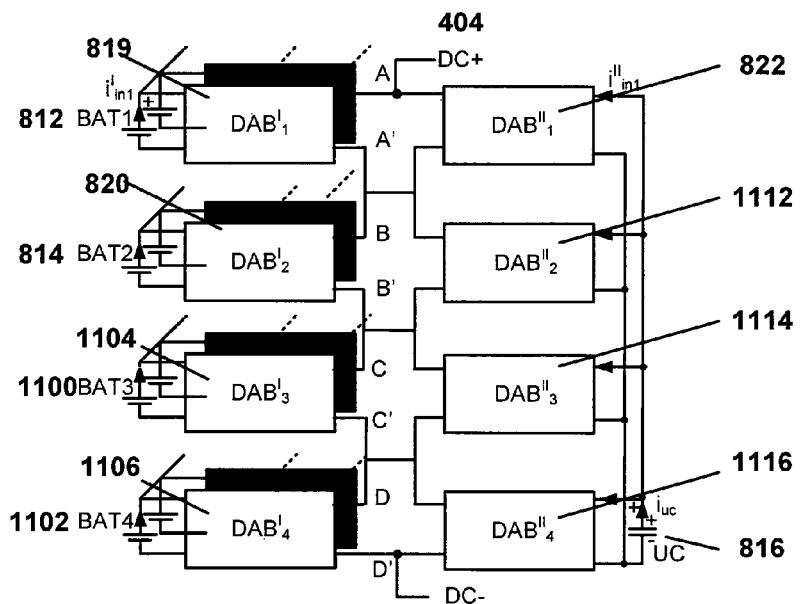
FIG. 11 shows FIG. 10(d) in more detail.
Figure 10:
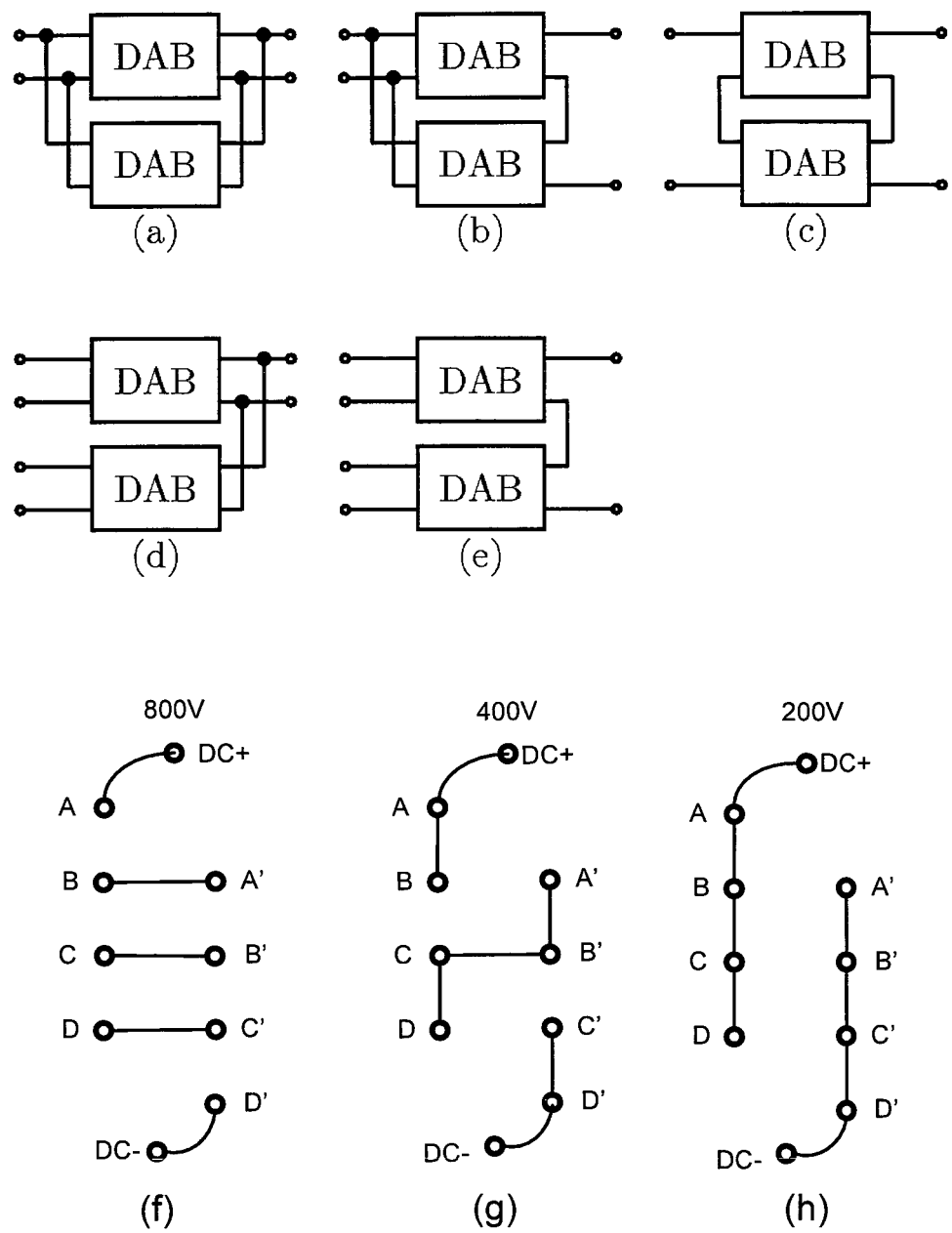
FIGS. 10(a)-(h) are different connection configurations for the converter in FIG. 9.

The modified IPOS connection configuration from FIG. 10(d) is shown in more detail in FIG. 11. Each battery 812, 814,1100,1102 is independently connected to a respective DAB 819,820,1104,1106, input. The DAB 819,820,1104,1106 outputs are connected in series to give a DC bus 404 voltage of 800V. This 800V configuration might be used where a 3 phase 440V AC supply is required. Similarly the ultracapacitor 816 is connected in parallel to a series of DABs 822,1112,1114,1116, with their outputs also connected in series to the DC bus 404 and are intermediately bridged to the outputs of each respective battery DABs 819, 820, 1104, 1106. The switching instants of each DAB 819, 820, 1104,1106, 822, 1112, 1114, 1116 may be interleaved to reduce the input current ripple 1300 from 222% to 47 as shown in FIG. 13(a) and the voltage output ripple 1302 from 0.67% to 0.08% % measured at the second port 808 as shown in FIG. 13(b).

DC-AC converters 811,826 may be 3 phase (single phase if low power) inverters.

The DABs can be reconnected in a different connection using external terminals that could be connected as desired using removable jumper cables or using insulated bus-bars.

Figure 14:
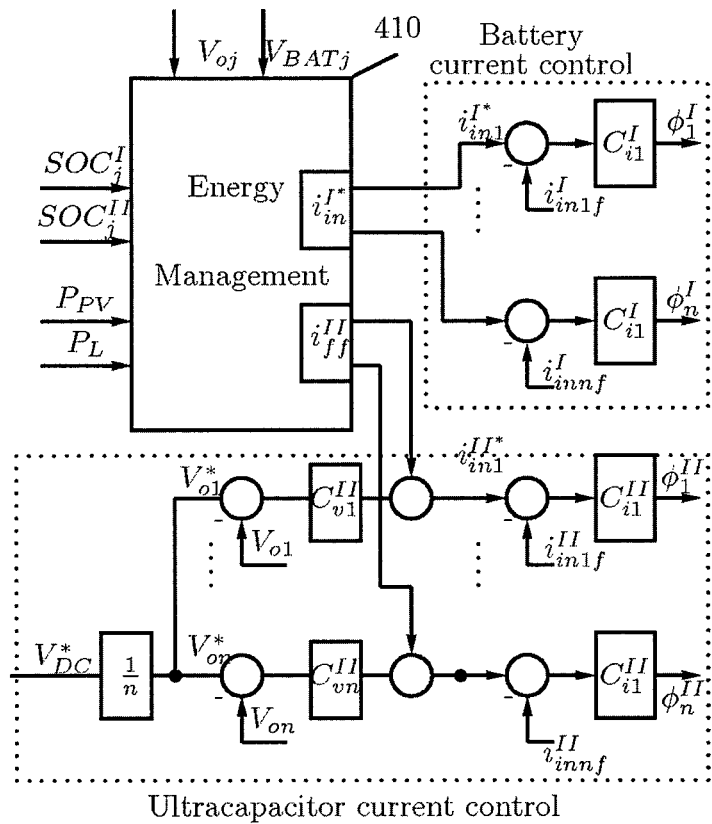
FIGS. 14(a)-(c) are logic diagrams of the control strategy.
Figure 14:
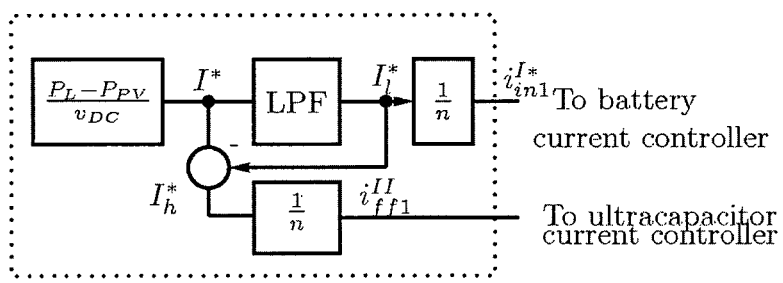

The controller 410 may be implemented according to FIGS. 14(a) to 14(c). As mentioned earlier the control strategy may be hardware based, software based or a combination of the two. For the example where the energy storage is batteries and an ultracapacitor, a hardware control implementation is shown in FIG. 14(a). The controller 410 receives the State of Charge ($SOC_{1-n}$) of each storage medium, the PV module 406 power $P_{PV}$ and the load 402 power $P_L$. Subtracting the $P_L$ from the $P_{PV}$ gives the current demand $P_{CESS}$ for the CESS 408. The $P_{CESS}$ is divided into a low frequency component $P_{BAT}$ to control the batteries 812,814 and a high frequency component $P_{UC}$ to control the ultracapacitor 816, by a low pass filter (LPF).

In FIG. 14(b) the control logic is shown to control the modified IPOS connection configuration in FIG. 11. Effectively each DAB has an individual current demand, and there is a current feedback loop for each DAB 900 to control the current. Each DAB 900 implements the current control by adjusting the relative phase between the inverter 904 and the converter 908.

The current demand for the ultracapacitor DABs is fed-forward to the output of a voltage feedback loop. The ultracapacitor DABs are more directly responsible for regulating the voltage as they have the responsiveness to do so, while the battery DABs are primarily responsible for maintaining the steady state power balance.

The current demands for each DAB are determined by the controller 410 according to which operational mode is been selected. For example the modes might include a) dynamic distribution of the current demand between the batteries and the ultracapacitor, b) distributing the SOC between the batteries, c) replacement of a battery, and d) charging of the ultracapacitor.

For mode (a), as can be seen in FIG. 14(c) the $P_{BATT}$ (or in this case $I^*_l$) current demand for the batteries is simply split equally to each battery DAB 819, 820, 1104,1106. Similarly the $P_{UC}$ (or in this case $I^*_h$) current demand for the ultracapacitor is simply split equally between each DAB 822, 1112, 1114,1116. The voltage feedback and current feedback formulas are shown in Equation 1 and 2:

$$C_v = K_{cv}(1 + 1/sT_{iv}) \tag{1}$$

$$C_i = K_{ci}(1 + 1/sT_{ii}) \quad (2)$$

The cut off frequency of the LPF is determined based on the relative capacities of the batteries and the ultracapacitor. The formula for the LPF is shown in Equation 3:

$$G_f = \frac{2\pi f_{cf}}{s + 2\pi f_{cf}} \quad (3)$$

The calculation of the overall current demand and the separation into high and low frequency components (shown in FIG. 14(c)) may be carried out inside the controller 410 in FIG. 14(b).

Figure 15:
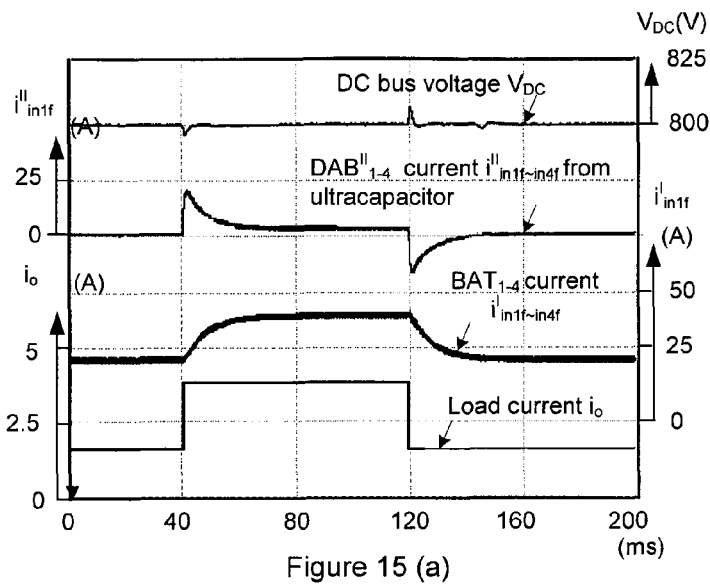
FIGS. 15(a)-(f) are graphs of the performance of different control modes.
Figure 15:
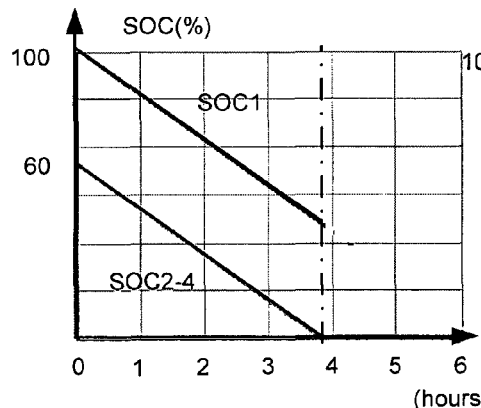
Figure 15:
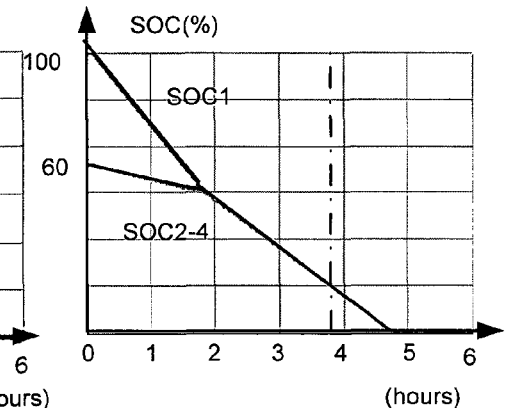
Figure 15:
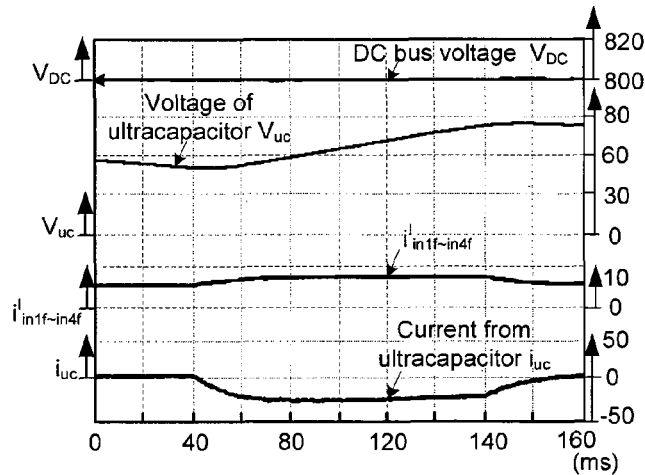

FIG. 15(a) shows a simulation of the performance of the controller in FIG. 14(c) with a step change in the $P_{CESS}$ current demand. Initially the increased current is supplied by the ultracapacitor, and after about 20 ms the increased current is supplied in the steady state by the batteries. This frequency response based decomposition of current reference can be tuned to the frequency response of the storage medium either manually or automatically.

For mode (b), as seen in FIG. 15(b) if the current demand is evenly shared to all batteries and one battery starts with a lower SOC than the rest, the batteries with higher SOC cannot be fully utilised. Flexible distribution of SOC is shown in FIG. 15(c), where the individual current demands to the batteries are varied to achieve SOC balance.

For mode (c), as seen in FIG. 15(d) when battery 812 is removed, the DAB 819 current tends to zero, DABs 820, 1104, 1106 share the shortfall, and ultracapacitor DAB 822 temporarily charges DABs 1112, 1114,1116,. As shown in FIG. 15(e) the impact on the DC bus 404 voltage is minimal.

For mode (d), as seen in FIG. 15(f) the ultracapacitor voltage is monitored and if it falls below a threshold, a negative current demand is sent to DABs 1112, 1114,1116, to charge the ultracapacitor and a positive current demand is sent to the DABs 819, 820, 1104,1106 to maintain the DC bus 404 voltage.

As shown in FIGS. 16(a) and 16(b), the output from the PV module 406 is volatile. As a result the $P_{CESS}$ includes a significant high frequency component. The ultracapacitor is able to provide the fast response to changes in demand, and the steady state shortfall is provided by the batteries.

Figure 26:
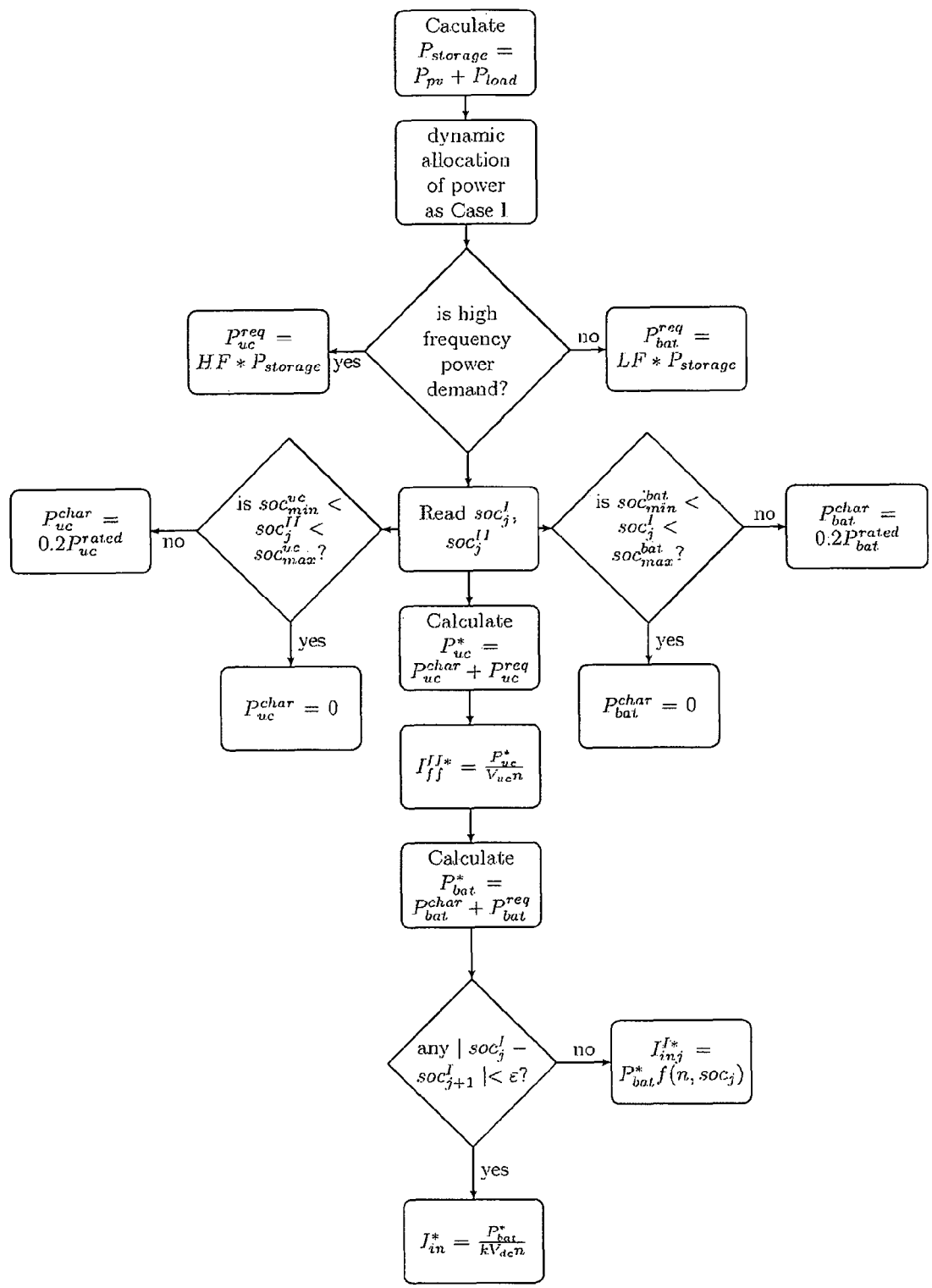
FIG. 26 is a flow diagram of a control algorithm according to an example embodiment.

The controller may be programmed with the algorithm 2600 shown in FIG. 26. The algorithm 2600 receives the inputs SOC (for each storage medium) $P_{PV}$ and $P_{Load}$ and determines the current demands for each DAB. As shown in FIG. 14(b) the current demands are integrated into the current and voltage feedback loops.

Figure 17:
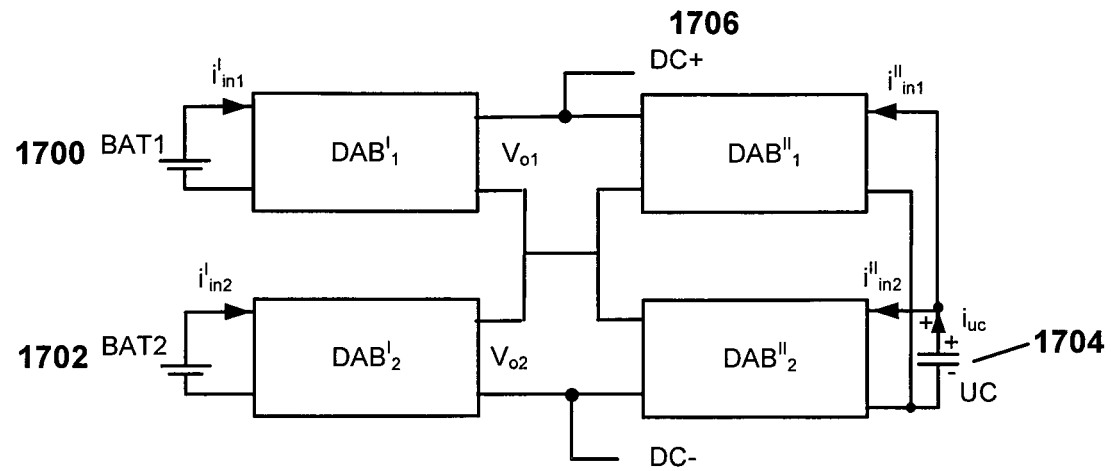
FIG. 17 is block diagram of an prototype according to an embodiment.
Figure 18:
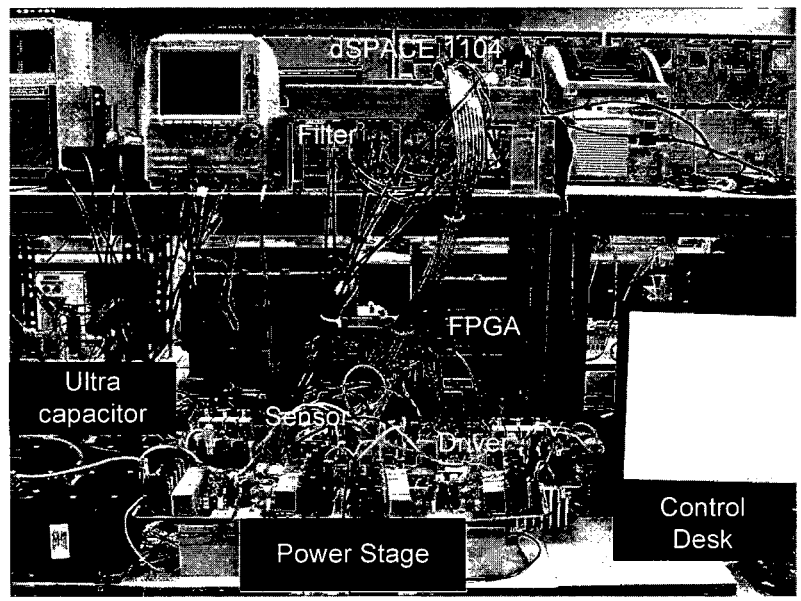
FIG. 18 is a photo of the prototype in FIG. 17.
Figure 21:
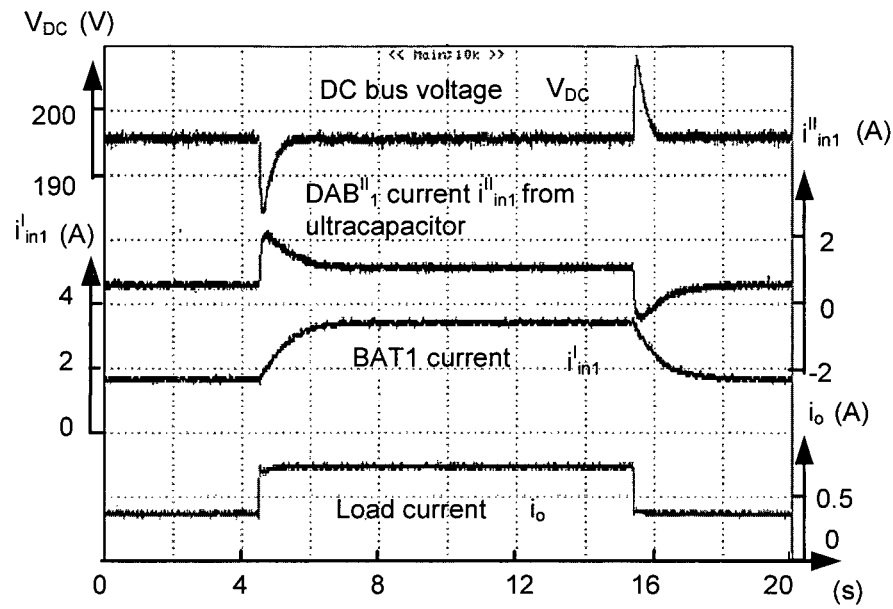
Figure 22:
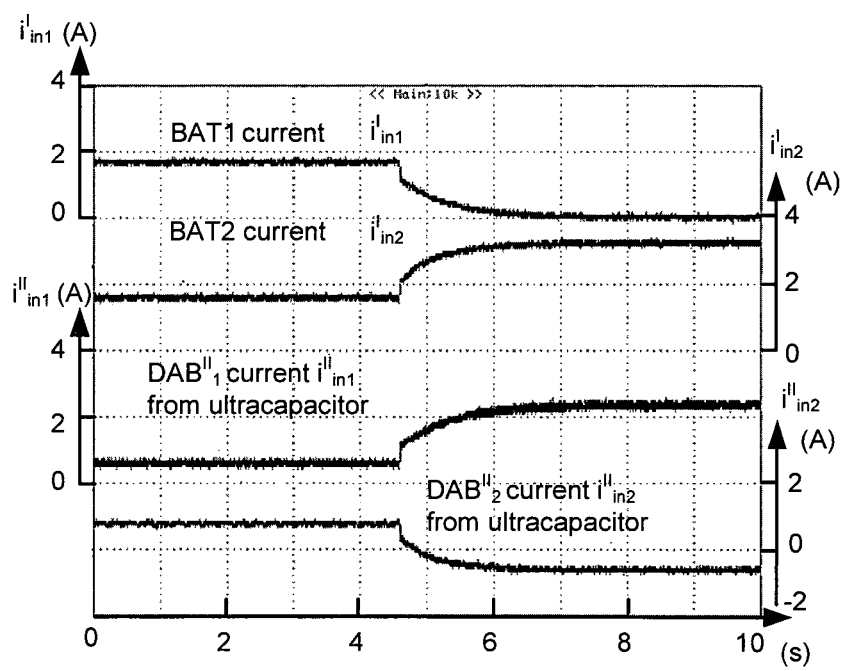
Figure 23:
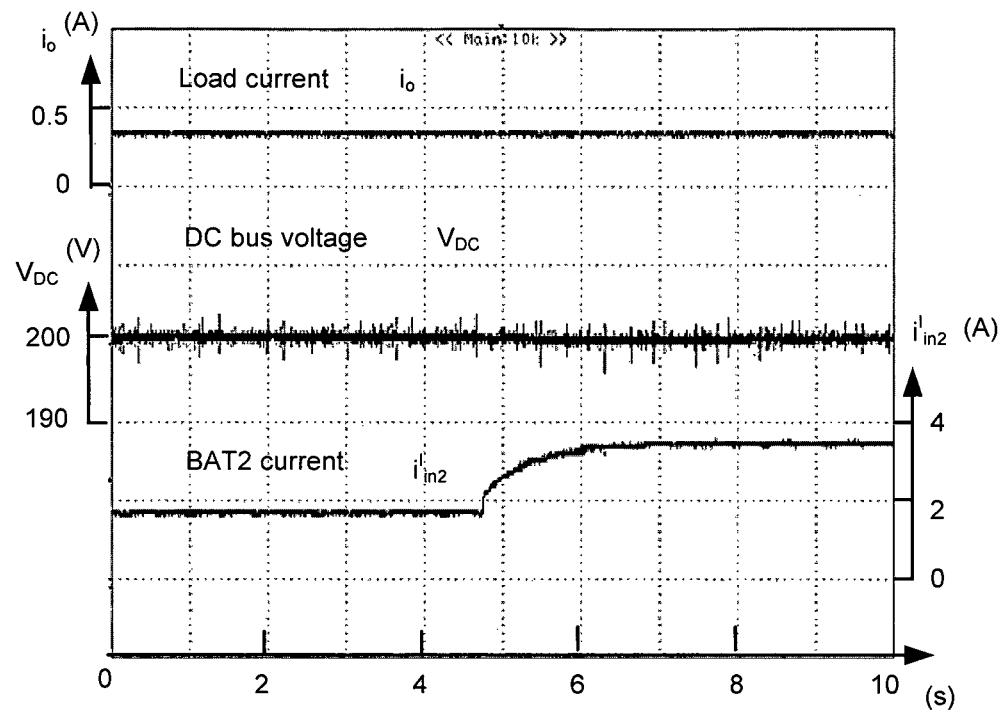
Figure 24:
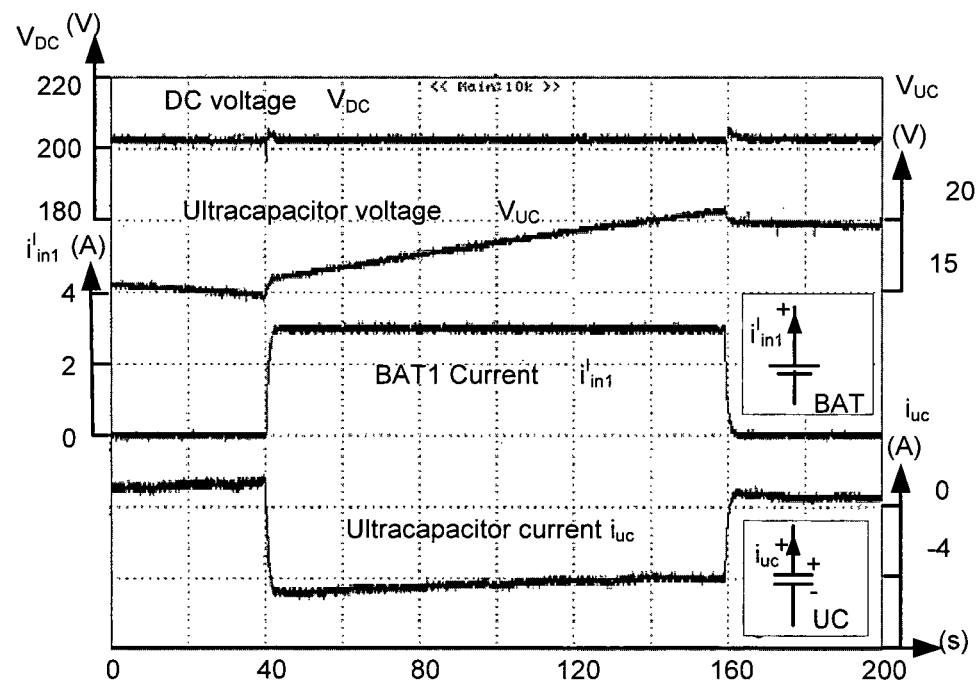

A prototype according to an embodiment is shown in FIGS. 17 and 18. In this setup there are two batteries 1700, 1702 and an ultracapacitor 1704 with a 200V DC bus 1706 voltage. The controller is implemented in a digital signal processor and field programmable gate array (FPGA) 1900 shown in FIG. 19, using the parameters shown in FIG. 20. FIG. 21 shows the relatively good performance in the DC bus 1706 voltage with a step load change from 300 W to 600 W. FIG. 22 shows the relatively good current performance and FIG. 23 shows the relatively good voltage performance when a battery is removed. Lastly FIG. 24 shows the relatively good performance at charging when the ultracapacitor voltage falls below the threshold.

One or more embodiments may be applied in a micro grid configuration, stand alone or island configuration or as the energy storage in an electric vehicle. Embodiments may have the advantages of independent dynamic allocation of steady state and transient power demand to different storage mediums, flexible distribution of power flow between different batteries, online battery replacement, continuous ultracapacitor charging or discharging, independent upgrading or power and energy capacity and/or modularity.

The invention claimed is:

1. An energy storage system comprising:
    a plurality of storage mediums having substantially different energy and power density each connected to a DC bus via a respective bidirectional isolated DC-DC converter; and
    a controller configured to independently determine a current demand for each storage medium based on a control mode;
    wherein a plurality of bidirectional isolated DC-DC converters connected to one or more first storage medium are connected in a modified input parallel output series configuration, a plurality of bidirectional isolated DC-DC converters connected to one or more second storage medium are connected in an input parallel output series configuration and the two pluralities of bidirectional isolated DC-DC converters are intermediately bridged.

2. The system in claim 1 wherein a high frequency current demand is determined for at least one of the storage medium with a relatively fast response and a low frequency current demand is determined for at least one of the storage medium with a relatively slow response.

3. The system in claim 2 wherein the capacity of the fast response storage medium is configured to support a desired power density.

4. The system in claim 3 wherein the fast response storage medium is an ultracapacitor.

5. The system in claim 2 wherein the capacity of the slow response storage medium is configured to support a desired energy density.

6. The system in claim 5 wherein the slow response storage medium is one or more batteries.

7. The system in claim 1 wherein the storage mediums are selected from the group consisting of batteries, ultracapacitors, fuel cells, electrolytics, fly wheels and any combination.

8. The system in claim 1 wherein the bidirectional isolated DC-DC converters are dual active bridges (DAB).

9. The system in claim 1 wherein the one or more first storage medium comprise a plurality of batteries and the one or more second storage medium comprise an ultracapacitor.

10. The system in claim 8 wherein each DAB includes a high frequency transformer.

11. The system in claim 8 wherein the DABs are configured to interleave a plurality of switching instants to reduce an output ripple.

12. The system in claim 2 wherein the low frequency current demand is determined using a low pass filter with a cut-off frequency determined based on a relative capacity of the fast response storage medium compared to the slow response storage medium.

13. The system in claim 1 wherein the control modes are selected from the group consisting of dynamic allocation of current demand between the storage mediums, state of charge balancing between the storage mediums, slow response storage medium removal, fast response storage medium charging and any combination.

14. The system in claim 2 wherein the low frequency current demand for the slow response storage medium is controlled using a current feedback loop.

15. The system in claim 2 wherein the high frequency current demand for the fast response storage medium is fed forward to the output of a voltage feedback loop.

16. A system according to claim 1, wherein the storage mediums can be swapped with a plug and play capability.

17. A system according to claim 1, wherein an overall current demand is required from the energy storage system and wherein the control mode is configured such that if current of a DC-DC converter connected to a storage medium tends to zero, the overall current demand is distributed among the DC-DC converters connected to the remaining storage mediums.

18. An energy apparatus comprising;
an energy generation system, and
an energy storage system adjacent to the energy generation system and configured to absorb any excess power and supply any shortfall power from the energy generation system;
wherein the energy storage system comprises:
a plurality of storage mediums having substantially different energy and power density each connected to a DC bus via a respective bidirectional isolated DC-DC converter; and
a controller configured to independently determine a current demand for each storage medium based on a control mode;
wherein a plurality of bidirectional isolated DC-DC converters connected to one or more first storage medium are connected in a modified input parallel output series configuration, a plurality of bidirectional isolated DC-DC converters connected to one or more second storage medium are connected in an input parallel output series configuration and the two pluralities of bidirectional isolated DC-DC converters are intermediately bridged.

19. The system in claim 18, wherein the energy apparatus is selected from the group consisting of a micro-grid, an isolated or standalone electrical system and an electric vehicle.

20. The system in claim 18, wherein the energy generation system is selected from the group consisting of a PV solar array, a wind turbine, micro hydro turbine, combined cycle turbine, and any combination.

21. A method of distributing current between a plurality of energy storage mediums connected between a generator and a load comprising:
determining an overall current demand based on an instantaneous generation of power from the generator and an instantaneous load power from the load;
controlling a current of a slow response energy storage medium based on a low frequency component of the overall current demand; and
controlling a current of a fast response energy storage medium based on a high frequency component of the overall current demand;
wherein the plurality of energy storage mediums are each connected to a DC bus via a respective bidirectional isolated DC-DC converter; and
wherein a plurality of bidirectional isolated DC-DC converters connected to one or more first storage medium are connected in a modified input parallel output series configuration, a plurality of bidirectional isolated DC-DC converters connected to one or more second storage medium are connected in an input parallel output series configuration and the two pluralities of bidirectional isolated DC-DC converters are intermediately bridged.

* * * * *